(12) United States Patent
Axer et al.

(10) Patent No.: US 12,506,744 B2
(45) Date of Patent: Dec. 23, 2025

(54) APPARATUS INCLUDING A TRANSCEIVER

(71) Applicant: NXP B.V., Eindhoven (NL)

(72) Inventors: Philip Axer, Hamburg (DE); Christian Herber, Hamburg (DE)

(73) Assignee: NXP B.V., Eindhoven (NL)

( * ) Notice: Subject to any disclaimer, the term of this patent is extended or adjusted under 35 U.S.C. 154(b) by 266 days.

(21) Appl. No.: 18/179,775

(22) Filed: Mar. 7, 2023

(65) Prior Publication Data

US 2023/0291748 A1     Sep. 14, 2023

(30) Foreign Application Priority Data

Mar. 9, 2022 (EP) ..................................... 22161132

(51) Int. Cl.
    *H04L 9/40*      (2022.01)
    *H04L 69/22*     (2022.01)

(52) U.S. Cl.
    CPC .......... *H04L 63/123* (2013.01); *H04L 63/162* (2013.01); *H04L 69/22* (2013.01)

(58) Field of Classification Search
    CPC ....... H04L 63/123; H04L 63/16; H04L 69/32; H04L 69/22
See application file for complete search history.

(56) References Cited

U.S. PATENT DOCUMENTS

| | | | |
|---|---|---|---|
| 7,706,363 B1 | 4/2010 | Daniel et al. | |
| 8,478,982 B2 | 7/2013 | Wang et al. | |
| 8,908,510 B2 | 12/2014 | Sela et al. | |
| 2010/0229013 A1 | 9/2010 | Diab et al. | |
| 2011/0099353 A1* | 4/2011 | Katzman | H04L 9/40 |
| | | | 712/E9.023 |
| 2015/0131798 A1* | 5/2015 | Chopra | H04L 63/162 |
| | | | 380/270 |
| 2017/0104851 A1* | 4/2017 | Arangasamy | H04L 63/0428 |
| 2023/0072491 A1* | 3/2023 | Dhoble | H04L 69/22 |

FOREIGN PATENT DOCUMENTS

EP      2854327 A1      4/2015

* cited by examiner

*Primary Examiner* — Esther B. Henderson

(57) ABSTRACT

An apparatus comprising: a receive-input for coupling to a transmission medium; a transceiver configured to receive signals representative of one or more data transmission units from the receive-input and output said data transmission units a protocol module configured to process at least a subset of the one or more data transmission units output from the transceiver according to a protocol, said processing including at least removing one or more fields of information from said subset of data transmission units associated with said protocol; and wherein the apparatus is configured to add at least one field to the subset of data transmission units processed by said protocol module, the at least one field comprising protocol information derived from said processing by the protocol module and provide said data transmission units with the at least one field added to a receive-output of the apparatus.

19 Claims, 2 Drawing Sheets

APPARATUS INCLUDING A TRANSCEIVER

CROSS-REFERENCE TO RELATED APPLICATIONS

This application claims the priority under 35 U.S.C. § 119 of European patent application no. 22161132.0, filed on 9 Mar. 2022 the contents of which are incorporated by reference herein.

FIELD

The present disclosure relates to an apparatus including a transceiver. In particular, the disclosure relates to an apparatus configured to add protocol information to a data transmission unit. The disclosure also relates to a method and a computer readable medium.

BACKGROUND

Transceivers, which are typically part of physical layer, PHY, module may be provided in an apparatus along with modules that provide other functionality. The other functionality may comprise security functionality, such as the provision of data confidentiality or data integrity functions.

SUMMARY

According to a first aspect of the present disclosure there is provided an apparatus comprising:
a receive-input for coupling to a transmission medium;
a transceiver configured to receive signals representative of one or more data transmission units from the receive-input and output said data transmission units;
a protocol module configured to process at least a subset of the one or more data transmission units output from the transceiver according to a protocol, said processing including at least removing one or more fields of information from said subset of data transmission units associated with said protocol; and
wherein the apparatus is configured to add at least one field to the subset of data transmission units processed by said protocol module, the at least one field comprising protocol information derived from said processing by the protocol module and provide said data transmission units with the at least one field added to a receive-output of the apparatus.

In one or more examples, the protocol comprises one implemented at the data link layer.

In one or more embodiments, said protocol comprises one of:
a) IEEE 802.1AE which defines MACsec and said one or more fields of information that are removed from said subset of data transmission units comprises one or more of a SecTag field and an ICV field;
b) IEEE 802.1CB and said one or more fields of information that are removed from said subset of data transmission units comprises an IEEE 802.1CB header; and
c) IEEE 1722 AVB and said one or more fields of information that are removed from said subset of data transmission units header data comprises a frame where the IEEE 1722 data transmission unit encapsulates the frame.

In one or more embodiments, said protocol module comprises a MACsec protocol module configured to processes the subset of one or more transmission units according to the MACsec protocol.

In one or more embodiments, said one or more fields removed by said MACsec protocol module include one or more of a SecTag field and an Integrity Check Value, ICV, field.

In one or more embodiments, said one or more data transmission units include:
data transmission units that have been processed according to said protocol by a transmitter device and subsequently received at the receive-input in said signals; and
data transmission units that have not been processed according to said protocol.

In one or more embodiments, the apparatus is configured to, for data transmission units that have not been processed according to said protocol, provide said data transmission units to the receive-output without said processing by the protocol module nor add said protocol information.

In one or more embodiments, said protocol information comprises one or more of:
an identifier of a port at which the data transmission unit arrived;
an identifier of whether or not the protocol module determined that data contained in the data transmission unit is authentic;
an identifier of a secure channel, wherein the secure channel comprises an encrypted communication channel between the apparatus and a further node coupled to the transmission medium; and
an indicator of link quality.

In one or more embodiments, said at least one field added to the subset of data transmission units by the apparatus comprises a header of a predetermined type.

In one or more examples, the header has a predetermined Ethertype such that it can be identified by a processor, said receive-output configured to couple to said processor.

In one or more embodiments, said protocol information added to each data transmission unit is configured to be equal to or less than the number of bytes of information of the one or more fields of information removed from said subset of data transmission units by the protocol module.

In one or more embodiments, said protocol comprises a network security protocol and said protocol module being configured to process includes being configured to process the subset of the one or more data transmission units by being configured to one or more of:
determine if data contained in the subset of data transmission units is authentic;
decryption of data contained within the subset of data transmission units;
determine if data contained in the subset of data transmission units is correct;
de-encapsulation of each of said subset of data transmission units.

In one or more embodiments, said protocol module being configured to remove the one or more fields of information from said subset of data transmission units removes all reference to the protocol in the data transmission units provided to the receive-output, other than the protocol information added by the apparatus.

According to a further aspect of the disclosure we provide the apparatus of the first aspect in combination with a processor, said processor configured to couple to the apparatus via at least the receive-output, wherein said processor is configured to read the at least one field comprising the protocol information added to the subset of data transmission units.

In one or more embodiments, the apparatus comprises:
a transmit-input to receive one or more data transmission units; and
a transmit-output for coupling to the transmission medium; and
wherein the transceiver is configured to output signals representative of data transmission units for transmission to the transmit-output;
wherein the apparatus is configured to identify data transmission units received at the transmit-input of a predetermined type;
wherein the protocol module is configured to process data transmission units of the predetermined type according to the protocol to generate said data transmission units for transmission.

In one or more embodiments, the apparatus comprises an integrated circuit including said transceiver, and the processor is configured to receive the data transmission units from the apparatus via a media access controller.

According to a second aspect of the disclosure, we provide a method comprising:
receiving, from a receive-input coupled to a transmission medium, signals representative of one or more data transmission units;
providing, by a transceiver, said one or more data transmission units derived from said signals;
processing, by a protocol module, at least a subset of the one or more data transmission units from the transceiver according to a protocol, said processing including at least removing one or more fields of information from said subset of data transmission units associated with said protocol; and
adding, by the apparatus, at least one field to the subset of data transmission units subject to said processing, the at least one field comprising protocol information derived from said processing; and
providing, to a receive-output, said data transmission units with the at least one field added.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A transceiver is configured to receive signals from a transmission medium and, in one or more examples, transmit signals over the transmission medium. It will be known to those skilled in the art that a transceiver may be part of a physical layer module or PHY of a network node. The PHY module may be provided as an integrated circuit and may provide an interface between "other devices" of the network node and the transmission medium. The PHY module may implement physical layer functions with reference to the known OSI model, and as such may be configured to receive signals from the transmission medium that are representative of data transmission units, such as packets or frames. The PHY module or transceiver thereof is configured to receive the signals and generate a bitstream that contains the data transmission units. Thus, the transceiver may be configured to receive analogue signals and, based on protocol rules, generate a digital signal or bitstream that represents the data transmission units. In terms of transmitting signals to the transmission medium, the PHY module or transceiver thereof may be configured to, based on data transmission units it receives and according to a protocol, transmit signals representative of the data transmission units, wherein the signals have one or more of an predetermined data rate, voltage, and line code.

The "other devices" may implement data link layer functions or higher level functions of the OSI model. The transmission medium may comprise a cable, an optical fibre or air in the case of wireless transmission.

In some examples, the transceiver or PHY module may be part of an apparatus, such as an integrated circuit, that also provides for, at least in part, other protocol functions. The other protocol functions may include security protocol based functions, such as data confidentiality and data integrity or non-security related functions. In one or more examples, it may be challenging to implement the other protocol functions due to limitations in the communication between a PHY module and the "other device(s)" to which it is configured to couple.

Figure 1:
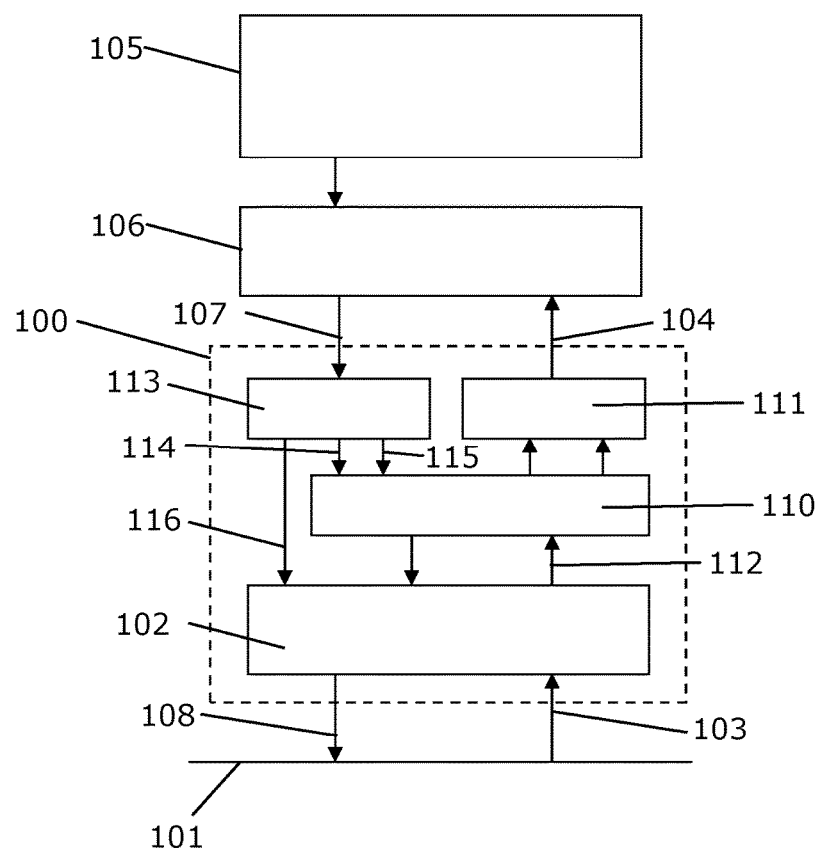
FIG. 1 shows an example embodiment of an apparatus according to the disclosure as well as a processor and controller.

FIG. 1 shows an example apparatus 100 according to the disclosure. The apparatus 100 may comprise an integrated circuit and may be configured to be coupled to a transmission medium 101 (shown generally as a line but could comprise an antenna-air interface). The apparatus 100 may comprise a transceiver and, accordingly, may include a PHY module 102 that provides the physical layer functionality.

The apparatus 100 may be configured to receive one or more signals from the transmission medium 101 at a receive-input 103. The PHY module 102 that comprises a transceiver is coupled to the receive-input 103 to receive said one or more signals. The PHY module 102, as also mentioned above, may be configured to convert the one or more signals to a digital signal that represents one or more data transmission units. It will be appreciated by those skilled in the art that a data transmission unit comprises a container or structure within which data is arranged to enable communication between the apparatus 100 and other nodes coupled to the transmission medium. Also, the data transmission units may be have fields added or removed from them or encapsulated/de-encapsulated as they pass through the apparatus 100 and the other devices coupled to it. The PHY module 102 may be configured to pass the one or more data transmission units to other parts of the apparatus 100, as will be described below, before providing the data transmission units (having received any additional processing) to a receive-output 104 for outputting to a further device.

The receive-output 104 may be configured to couple to a processor 105 and, in this example, is configured to couple to the processor 105 via a controller 106. The controller 106 may be configured to implement, at least in part, data link layer functionality. Such an arrangement will be familiar to those skilled in the art of Ethernet based network implementations. In other examples (not shown), the controller 106 is not present and the apparatus provides data directly to the processor 105.

The apparatus 100 may be configured to receive data from the processor 105 and controller 106 at a transmit-input 107 and provide for transmission of signals based on said data at a transmit-output 108 that is configured to couple to the transmission medium 101.

In the one or more examples described herein, the apparatus 100 and processor 105 described may implement Ethernet protocols. The controller 106 may comprise a Media Access Controller or "MAC". Some Ethernet protocols, such as Ethernet security protocols, may be implemented, at least in part, by the apparatus 100 that includes the PHY module 102. The media access controller 106 may be configured to receive data transmission units from the processor 105 and provide for addition, to said data transmission units, of one or more of: a preamble, a start-of-frame delimiter, a frame check sequence (such as a Cyclic Redundancy Check code) and at least a predetermined time-space between each data transmission unit, sometimes known as an inter-packet gap or inter frame space. Likewise, data transmission units received from the apparatus 100 may be processed by the MAC 106 to remove the preamble and/or check the integrity of the data of the data transmission unit based on the frame check sequence. The typical processing performed by a MAC will be familiar to those skilled in the art.

In one or more Ethernet based implementations, the receive-input 103 may comprise part of a media dependent interface, known as MDI, of the PHY module 102 of the apparatus 100. The receive-output 104 may comprise part of a media independent interface, known in the art as xMII. Likewise, the transmit-input 107 may be part of the xMII interface and the transmit-output may be part of the MDI interface.

In many implementations of Ethernet, the apparatus 100 or at least the PHY module 102 thereof, may be configured to receive data at a line rate speed and transmit the signals to the processor 105 (and controller 106) at the same line rate speed. Accordingly, the apparatus 100 may be configured to perform its processing on-the-fly at line rate speed.

A PHY module 102 is typically configurable by way of a further interface, such as a "Management Data Input/Output", MDIO, interface, that allows communication to and from the PHY module 102. However, this communication interface typically has a maximum data rate much lower than the line speed, i.e. kbps for the communication interface vs. Mbps or Gbps for the xMII and MDI interfaces. Thus, the PHY module's communication interface is not suitable for real time communication.

The apparatus 100 includes a protocol module 110 configured to process at least a subset of the one or more data transmission units from the transceiver or PHY 102, according to a protocol.

In one or more examples, the protocol comprises a protocol implemented at the data link layer, or above, with reference to the OSI model. It will be appreciated that the provision of an apparatus 100 that includes the PHY module 102 (and thus provides a coupling to the transmission medium 101) along with data link layer protocol functionality is convenient. However, in one or more examples, providing such protocol functionality packaged in an apparatus that provides physical layer functionality can be challenging. For example, separation of such protocol functionality from the MAC 106 or processor 105, where such functionality may otherwise be expected to be provided, may create communication difficulties between the protocol module 110 and the processor 105 and controller 106.

The protocol according to which the protocol module 110 is configured to operate may comprise the MACsec protocol. The standard IEEE 802.1AE defines MACsec. In other examples, the protocol may comprise IEEE 802.1CB. In other examples, the protocol may comprise IEEE 1722 AVB. In other examples, the protocol module 110 may provide processing according to other protocols and/or combinations of the above-mentioned protocols.

MACsec comprises an example of an Ethernet security protocol or standard. MACsec comprises a network security protocol that operates at a medium access control layer. As will be known to those skilled in the art, MACsec may define connectionless data confidentiality and integrity rules and processes for media access independent protocols. The examples that follow will focus on an example implementation in which the protocol module 110 comprises a MACsec protocol module. However, it will be appreciated however that other protocols, whether security related or not, may be implemented at least in part, or in full, by the apparatus 100 or, more particularly, the protocol module 110.

The processing of the subset of data transmission units performed by the protocol module 110 will vary depending on which protocol the protocol module 110 implements. However, in general, the processing may include one or more of performing routing or addressing functions, performing data integrity checks, performing encryption and/or decryption of the data contained within the data transmission units or performing decoding or encoding functions of the data contained within the data transmission units or the data transmission units themselves.

In the present MACsec example implementation and any other network security protocol implementation, the processing may include the protocol module 110 being configured to determine if data contained in the subset of data transmission units is authentic, such as with reference to one or more error detection or error correction codes present in the data transmission unit(s). In one or more examples, the processing may include de-encapsulation of each of said subset of data transmission units. Thus, the MACsec protocol involves the addition of a header (e.g. Sectag) and integrity check value, ICV, prior to transmission to the transmission medium. Accordingly, when a MACsec processed data transmission unit is received by the apparatus 100, the protocol module may be configured to remove the header and ICV thereby de-encapsulating the data transmission unit. In more detail, the processing may comprise checking the data transmission unit against one or more (e.g.

MACsec) protocol rules and decryption and authentication of a payload of the data transmission unit.

In other examples the processing may comprise merging datastreams from multiple sources, such as by use of the IEEE 802.1CB. The processing may include extracting information about the elimination procedure of IEEE802.1CB, as will be familiar to those skilled in the art. The processing may include processing and subsequent removal of a 802.1CB Redundancy tag (R-tag). In other examples, the processing may comprise adding or extracting payload information to a IEEE 1722 frame (for example a Controller Area Network, CAN, PDU which is inside a IEEE1722 frame).

The protocol module 110 may be configured to process a subset of the data transmission units that are received because not all of the data transmission units received by the apparatus 100 may have been subjected to MACsec (or other protocol) processing. Thus, the data transmission units received at receive-input 103 in the signals may include data transmission units that have been processed according to said protocol by a transmitter device (not shown) and subsequently received at the receive-input 103. These data transmission units are part of the subset processed by the protocol module 110. However, the data transmission units received at receive-input 103 may also include data transmission units that have not been processed according to said protocol by the transmitter or sender. Thus, for example, data transmission units that have not been MACsec processed by their sender do not need to be processed by the protocol module 110. For data transmission units that have not been processed according to said protocol such as MACsec, the apparatus 110 may be configured to provide said data transmission units (those not in the subset) to the receive-output 104 without processing by the protocol module 110.

As explained above, the processing by the protocol module 110 may inherently include removing one or more fields of information from each of the data transmission units in said subset. Those one or more field are associated with said protocol in that the protocol mandates their removal and, likewise, the addition of the one or more fields at the sender (not shown) of the data transmission unit.

Thus, said one or more fields removed by said MACsec implementation of the protocol module 110 may include one or more of a SecTag field and an Integrity Check Value, ICV, field. For a IEEE 802.1CB implementation said one or more fields of information that are removed from said subset of data transmission units may comprise the 802.1CB header. For a IEEE 1722 AVB of the protocol module 110 said one or more fields of information that are removed from said subset of data transmission units may comprise frames where the IEEE 1722 PDU may act as a container for a CAN frame for example.

The removal of the one or more fields of information by a protocol module 110 that is located in an apparatus 100 along with the PHY module 102 (and not in another device with the MAC 106 or processor 105) means that information contained in the removed one or more fields is lost to the MAC 106 or processor 105. As mentioned above, communication between the PHY 102/apparatus 100 and the processor 105 can be limited and generally unsuitable for real time communication as data transmission units arrive at the apparatus 100.

Thus, the apparatus 100 is configured to add at least one field to the subset of data transmission units processed by said protocol module 110. The at least one field added comprises protocol information derived from said processing by the protocol module 110. Thus, the information that is contained in or derived from the one or more fields that are removed by the protocol module 110, or a summary thereof, may be added as the protocol information to the data transmission unit in the form of a one or more fields. The protocol information may be derived from the processing performed by the protocol module 110, such as confirmation that the ICV value was valid. The one or more fields added are different to those removed by the protocol module 110, such as in terms of where in the data transmission unit the protocol information is present or the form it takes. The apparatus 100 is then configured to pass the data transmission units with the protocol information added thereto to the receive-output 104 for processing by the controller 106 and/or processor 105.

In the present example apparatus 100, the functionality of adding the protocol information is provided by a header module 111. Thus, the at least one field added to the subset of data transmission units by the apparatus 100 comprises a header of a predetermined type. The header of predetermined type may be configured such that it is detectable by the processor 105, which can then read the information it contains. The header of predetermined type may be configured such that it is ignored by the controller 105 and therefore does not interfere with medium access control processing performed by the MAC 106.

In one or more examples, the predetermined type of header comprises a header including a predetermined EtherType field such that it can be identified by the processor 105. The use of the EtherType field, which typically comprises a two-octet field in an Ethernet-based frame (i.e. data transmission unit), may provide a means for identifying the data transmission units by the processor 105 without requiring other components to be reconfigured to account for its presence.

Figure 2:
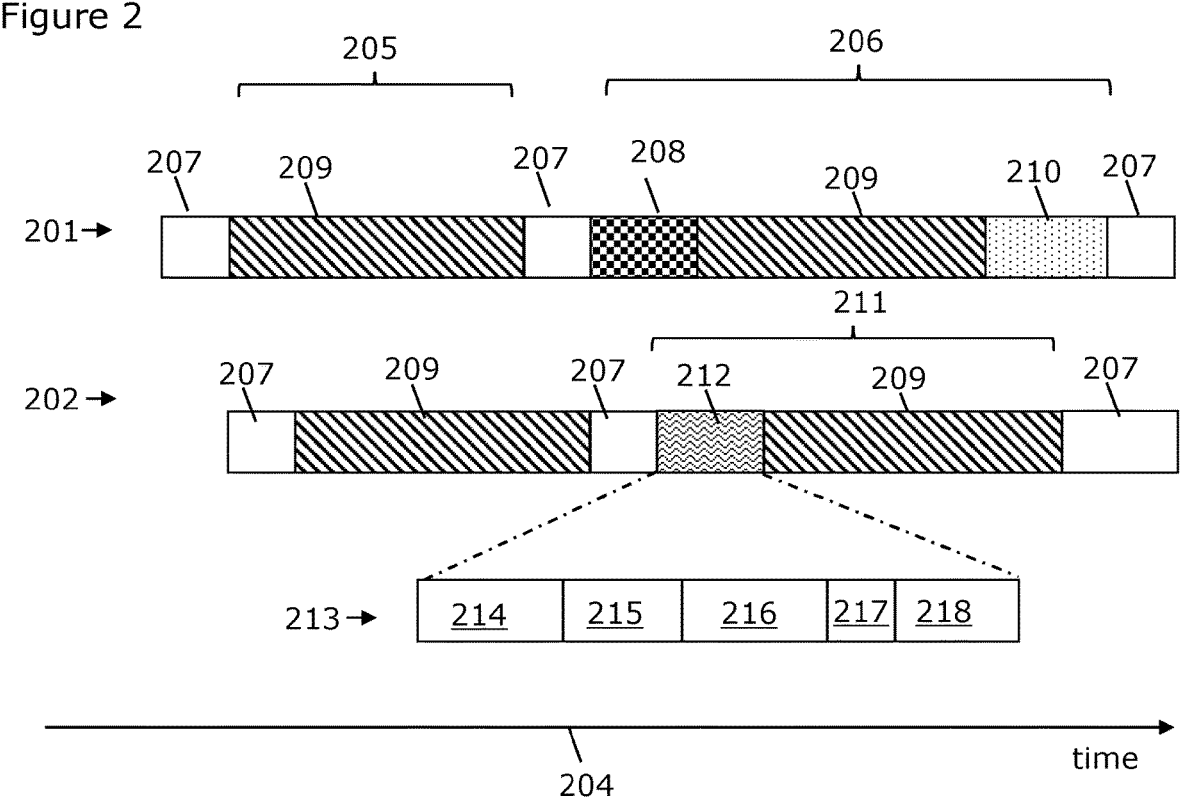
FIG. 2 shows an example of the structure of signals representative of data transmission units received by the apparatus and at different points in said apparatus of FIG. 1.

Example FIG. 2 shows signals and, in particular, data transmission units with respect to time. FIG. 2 shows a signal 201 received by the apparatus 100. The signal 201 may be representative of the signal received at receive-input 103 or that provided to the protocol module 110 from the PHY module 102 at line 112. The signal is shown as a plurality of patterned sections that represent the different parts of a plurality of data transmission units.

The signal 201 comprises a first data transmission unit 205 and a second data transmission unit 206 separated by time gaps known as inter-packet gaps 207.

The first data transmission unit 205 or "frame" has not been processed according to the protocol by its sender. Thus, in this example, it is a non-MACsec processed frame. Accordingly the apparatus 100 may be configured to forward this first data transmission unit 205 to the receive-output 104 or the protocol module 110 and header module 111 may be configured to ignore it. From the point-of-view of the protocol module 111, the first frame 205 contains a data portion 209.

The second data transmission unit 206 has been processed according to the protocol by its sender. Thus, in this example, it is a MACsec processed frame. The protocol module 110 may be configured to identify the frame as a MACsec processed frame by one or more fields of information within it. For example, the second data transmission unit 206 inherently has a predetermined header 208, which in the MACsec implementation, comprises a SecTag header 208. A data section 209 of the second frame 206 follows. The second frame 206 further includes an ICV field 210.

The processing performed by the protocol module 110 removes the SecTag header 208 (once checked as required by the MACsec protocol) and the ICV field 210 (once checked as required by the MACsec protocol).

The signal 202 shows the output of the apparatus 100 at the receive-output 104 or, more particularly, the output of the header module 111. The first frame 205 has not changed in this example. However, the second frame 211 no longer includes the SecTag field 208 nor the ICV 210. Thus, the protocol module 110 being configured to remove the SecTag field 208 and the ICV 210, as required by the MACsec protocol, removes all reference to the MACsec protocol in the data transmission unit 206. The processor 106 is therefore blind to whether the second data transmission unit 206 arrived via a MACsec port or with any MACsec processing.

However, in this and one or more examples, the header module 212 has added the header 212 that contains the protocol information.

The protocol information added to each data transmission unit 211 may be configured to be equal to or less than the number of bytes of information in the one or more fields (i.e. fields 208 and 210) of information removed from the data transmission units by the protocol module 110. For example, the header 212 may be configured to comprise 32 bits, which may be less than the number of bits or bytes removed.

A more detailed view of the header 212 is shown at 213. The header 212 comprises an EtherType field 214, which may be configured to allow for the processor 105 to identify the header 212 added by the header module 111. The header 212 may include one or more protocol information fields, such as field 215. In one or more examples, the purpose of the fields may be predetermined and, for example, the header 212 may comprise an indicator 216 of whether the data transmission unit 211 that contains the header 212 arrived at the apparatus 100 by a controlled port or an uncontrolled port. It will be appreciated that the port is a logical port that indicates whether the data transmission unit 211 was a MACsec frame. The header 212 may comprise an indication 217 of the channel identifier of a channel that the data transmission unit 211 used to arrive at the apparatus 100. It will be appreciated by those skilled in the implementation of MACsec, that the channel identifier may identify the cryptographic keys used by the protocol module 111 and that of the sender to communicate. The header 212 may comprise padding 218 to make the header a predetermined length.

In general however, the protocol information added by the apparatus 100 or header module 111 depends on the protocol implemented by the protocol module 110. Which protocol information is provided in the header 212 may be customizable depending on the implementation.

In general however, the protocol information added in the one or more fields 212 comprises one or more of:
 an identifier of a port at which the data transmission unit arrived;
 an identifier of whether or not the protocol module determined that data 209 contained in the data transmission unit is authentic, such as by checking using the ICV field 210; and/or
 an identifier of a secure channel, wherein the secure channel comprises an encrypted communication channel between the apparatus and a further node coupled to the transmission medium.

In other examples, the protocol information may include PHY status information which may be indicative of the quality of the link, which may comprise a Signal Quality Indicator (SQI). In the example of the IEEE 1722 protocol, the protocol information may comprise status information that the data transmission unit was updated and in which way it was updated. This allows the processor 105 to keep track of it and changes made thereto. In examples relating to IEEE 802.1CB, the protocol information may include information about the elimination procedure defined in that protocol.

Returning to FIG. 1, the apparatus 100 also shows a filter 113 coupled to the transmit-input 107. The filter is configured to identify which of the data transmission units received at the transmit-input require processing by the protocol module 110 before transmission by the PHY module. The filter 113 may use predetermined information, such as a predetermined MAC address, EtherType, VLAN identifier or other fields, to identify which data transmission units require processing by the protocol module 110 and which do not. The filter 113 may also determine which secure channel to use to send the data transmission unit based on predetermined information.

Data transmission units determined to require processing by the protocol module 110 are forwarded thereto by data line 114 and metadata line 115. The metadata line may inform the protocol module 110 which secure channel to use among other information. Data transmission units determined not to require processing by the protocol module 110 are forwarded to the PHY module 102 by line 116.

The apparatus 100 is typically provided in combination with an appropriately configured processor 105 for reading the header 212 (or other one or more fields) added by the apparatus 100 and taking whatever action is deemed useful. In one or more examples, the apparatus 100 may be provided in combination with software or firmware that is able to reconfigured a legacy processor 105 to recognise the header 212 and take whatever action is deemed useful. The processor 105 may be configured to extract the information from the header 212 and forward it to application software for further processing.

In the examples described, the header module 111, the filter module 113, the protocol module 110, and the PHY module 102 are shown as discrete "blocks" but it will be appreciated that the blocks are provided to show the functions of the apparatus 100 and the physical layout of the apparatus may or may not include such a separation of functionality. For example, in one or more examples, physical components may be provided to perform one or more of the removing of protocol related fields, adding of the protocol information and protocol processing functions. However, in other examples, a processor (not shown) may be provided and one or more of the functions provided by the header module 111, the filter module 113, the protocol module 110, and the PHY module 102 may be provided by software executed by the processor. In other examples the apparatus 100 may be embodied as a combination of software executed by one or more processors and appropriately configured hardware. It will be appreciated that by processor it is intended to include any processing entity such as a general purpose processor, FPGA, programmable logic controller or appropriately configured hardware.

Figure 3:
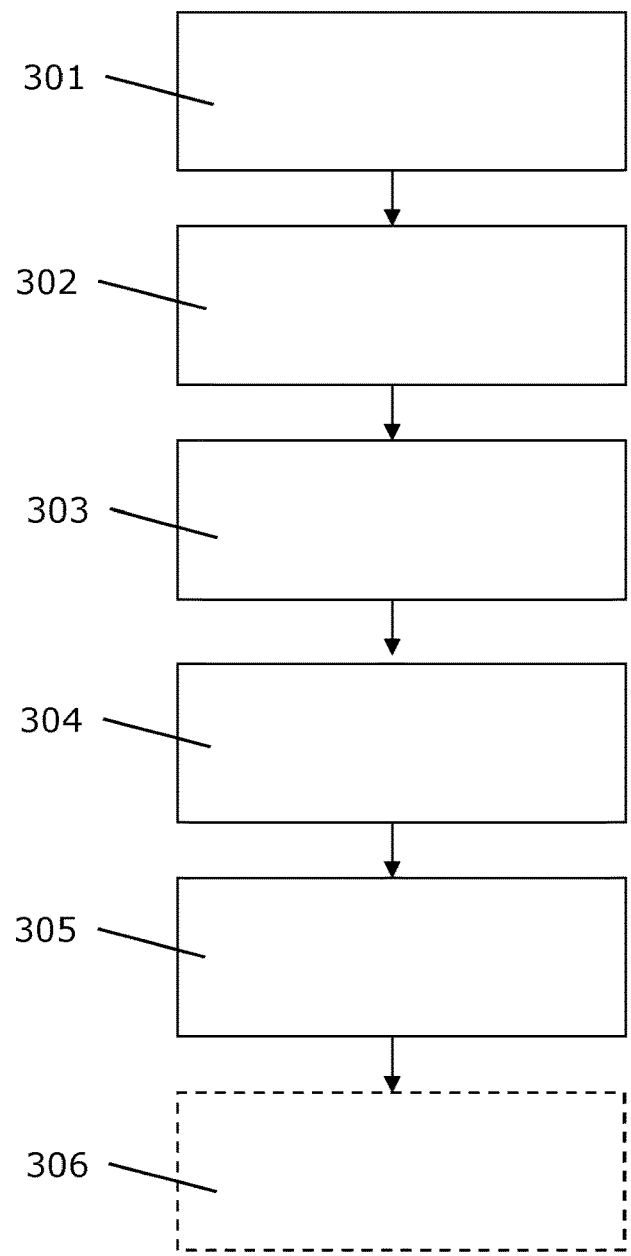
FIG. 3 shows a flow chart illustrating an example method.

Example FIG. 3 shows a method of processing data transmission units wherein a protocol is implemented in combination a physical layer module 102 in an apparatus 100.

The method includes receiving 301, from a receive-input coupled to a transmission medium, signals representative of one or more data transmission units; providing 302, by a transceiver, said one or more data transmission units derived from said signals; processing 303, by the protocol module 110, at least a subset of the one or more data transmission units from the transceiver according to a protocol, said processing including at least removing one or more fields of information from said subset of data transmission units associated with said protocol; and adding 304, by the apparatus 100, at least one field to the subset of data transmission units subject to said processing, the at least one field comprising protocol information derived from said processing; and providing 305, to a receive-output, said data transmission units with the at least one field added.

The method may optionally include a step 306 of taking action, by a processor 105, based on the protocol information added to the data transmission unit by the apparatus 100.

Figure 4:
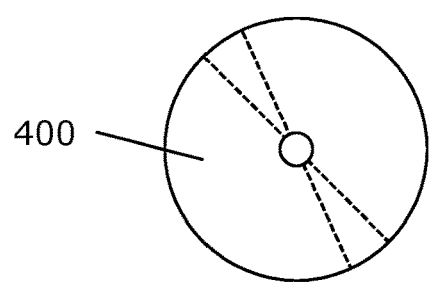
FIG. 4 shows an example computer readable medium comprising computer program code for implementing the method of FIG. 3.

Example FIG. 4 shows a computer readable medium 400 which includes computer program code for implementing step 306 for the processor 105. In other examples, the computer program code may be configured to provide for steps 301 to 305 at the apparatus 100.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
a receive-input for coupling to a transmission medium;
a transceiver configured to receive signals representative of data transmission units from the receive-input and output the data transmission units; and
a protocol module configured to:
process at least a subset of the data transmission units output from the transceiver according to a protocol;
remove one or more fields of information from the subset of the data transmission units;
add at least one field to each of the subset of data transmission units, the at least one field comprising protocol information derived from the processing of the subset of the data transmission units by the protocol module, wherein the protocol information added to the subset of the data transmission units is configured to be equal to or less than the number of bytes of information of the one or more fields of information removed from the subset of the data transmission units by the protocol module; and
after adding the at least one field, provide the subset of the data transmission units to a receive-output of the apparatus.

2. An apparatus according to claim 1, wherein the protocol is implemented at the data link layer.

3. The apparatus of claim 1, wherein the protocol comprises:
IEEE 802.1AE defining a MACsec protocol, wherein the one or more fields of information that are removed from the subset of the data transmission units comprises one or more of a SecTag field or an integrity check value (ICV) field.

4. The apparatus of claim 1, wherein the protocol comprises one of:
IEEE 802.1AE, defining a MACsec protocol, wherein the one or more fields of information that are removed from the subset of the data transmission units comprises one or more of a SecTag field or an integrity check value (ICV) field;
IEEE 802.1CB, wherein the one or more fields of information that are removed from the subset of the data transmission units comprises an IEEE 802.1CB header; or
IEEE 1722 AVB, wherein the one or more fields of information that are removed from the subset of the data transmission units comprises an IEEE 1722 frame.

5. The apparatus of claim 1, wherein the protocol module comprises a MACsec protocol module configured to process the subset of the data transmission units according to the MACsec protocol.

6. The apparatus of claim 5, wherein the one or more fields removed by the MACsec protocol module include one or more of a SecTag field or an integrity check value, ICV, field.

7. The apparatus of claim 1, wherein the data transmission units include:
   a first subset of the data transmission units that have been processed according to the protocol and subsequently received at the receive-input; and
   a second subset of the data transmission units that have not been processed according to the protocol.

8. The apparatus of claim 7, wherein the apparatus is configured to, for the second subset of the data transmission units that have not been processed according to the protocol, provide the second subset of the data transmission units to the receive-output without the processing by the protocol module.

9. The apparatus of claim 1, wherein the protocol information comprises an identifier of a port at which a corresponding data transmission unit of the subset of data transmission units arrived.

10. The apparatus of claim 1, wherein the protocol information comprises an identifier of whether or not the protocol module determined that data contained in a corresponding data transmission unit of the subset of data transmission units is authentic.

11. The apparatus of claim 1, wherein the protocol information comprises one or more of:
   an identifier of a secure channel, wherein the secure channel comprises an encrypted communication channel between the apparatus and a further node coupled to the transmission medium; or
   an indicator of link quality.

12. The apparatus of claim 1, wherein the at least one field added to the subset of the data transmission units comprises a header of a predetermined type.

13. The apparatus of claim 12, wherein the header has a predetermined Ethertype identifiable by a processor, and wherein the receive-output is configured to couple to the processor.

14. The apparatus of claim 1, wherein the protocol comprises a network security protocol and the protocol module is configured to:
   determine if data contained in the subset of the data transmission units is authentic;
   decrypt data contained within the subset of data transmission units;
   determine if data contained in the subset of the data transmission units is correct; or
   de-encapsulate each of the subset of the data transmission units.

15. The apparatus of claim 1, wherein the protocol module is configured to, when removing the one or more fields of information from the subset of the data transmission units, remove all reference to the protocol in the subset of the data transmission units, other than the protocol information added by the protocol module.

16. The apparatus of claim 1, wherein the apparatus is in combination with a processor, wherein the processor is configured to couple to the apparatus via at least the receive-output, and wherein the processor is configured to read the at least one field comprising the protocol information added to the subset of the data transmission units.

17. The apparatus of claim 1, wherein the apparatus further comprises:
   a transmit-input to receive a plurality of data transmission units; and
   a transmit-output for coupling to the transmission medium; and
   wherein the transceiver is configured to output signals representative of a subset of the plurality of data transmission units for transmission to the transmit-output;
   wherein the apparatus is configured to identify received data transmission units received at the transmit-input as having a predetermined type;
   wherein the protocol module is configured to process the identified data transmission units having the predetermined type according to the protocol to generate the subset of the plurality of data transmission units for transmission.

18. The apparatus of claim 4, wherein the apparatus comprises an integrated circuit including the transceiver, and the processor is configured to receive the subset of the data transmission units from the apparatus via a media access controller.

19. An apparatus comprising:
   a receive-input for coupling to a transmission medium;
   a transceiver configured to receive signals representative of data transmission units from the receive-input and output the data transmission units; and
   a protocol module configured to:
      process at least a subset of the data transmission units output from the transceiver according to a protocol;
      remove one or more fields of information from the subset of the data transmission units;
      add at least one field to each of the subset of data transmission units, the at least one field comprising protocol information derived from the processing of the subset of the data transmission units by the protocol module, wherein the protocol module is configured to, when removing the one or more fields of information from the subset of the data transmission units, remove all reference to the protocol in the subset of the data transmission units, other than the protocol information added by the protocol module; and
      after adding the at least one field, provide the subset of the data transmission units to a receive-output of the apparatus.

* * * * *